United States Patent

[11] 3,569,946

[72] Inventor Wilbur G. Hespenheide
Malvern, Pa.
[21] Appl. No. 763,241
[22] Filed Sept. 25, 1958
[45] Patented Mar. 9, 1971
[73] Assignee Burroughs Corporation
Detroit, Mich.

[54] MAGNETIC MATERIAL AND DATA STORE
1 Claim, 5 Drawing Figs.

[52] U.S. Cl. .......... 340/174
[51] Int. Cl. .......... G11c 11/12, G11c 5/04
[50] Field of Search .......... 204/43; 340/174, 174 (CT), 174 (TF), 174 (TW); 307/88

[56] References Cited

UNITED STATES PATENTS

| | | | |
|---|---|---|---|
| 2,644,787 | 7/1953 | Bonn et al. | 204/43 |
| 2,730,491 | 1/1956 | Moline et al. | 204/43 |
| 2,792,563 | 5/1957 | Rajchman | 340/174 |
| 2,945,217 | 7/1960 | Fisher et al. | 340/174 |
| 2,846,672 | 8/1958 | Hennessey | 340/174 |
| 3,083,353 | 3/1963 | Bobeck | 340/174 |
| 2,920,317 | 1/1960 | Mallery | 340/174 |

OTHER REFERENCES

Publication I: " Nondestructive Sensing of Magnetic Cores" BY Buch & Frank - from Communications and Electronics Jan. 1954 pp. 822— 830

Publication II: " Magnetic Domains by the Longitudinal Kerr Effect" by Fowler, Jr. & Fryer from Physical Review: vol. 94, No. 1, April 1, 1954, pp. 52–56.

Publication III: " The Nondestructive Read-out of Magnetic Cores" by Athanasios Papoulis from Proceedings of the IRE, Aug. 1954, pp. 1203–1288.

Publication IV: " Preparation of Thin Magnetic Films and Their Propertes" by M. S. Blais Jr. from Journal of Applied Physics Aug. 1955; pps. 975— 980

Publication V: " A Compact Coincident-Current Memory" by Pohn and Rubens from Proceedings of the Eastern Joint Computer Conference; Dec. 10—12-1956 pps. 120— 123

Publication VI: " New Twist in Memory Devices," Journal of Applied Physics, Feb. 1958, page VII Publication VII: " A New Storage Element Suitable for Large Sized Memory Arrays—The Twistor," The Bell System Technical Journal, Nov. 1957, pp. 1319 to 1340, Fig. 6 on page 1323.

*Primary Examiner*—Stanley M. Urynowicz, Jr.
*Attorney*—Kenneth L. Miller

ABSTRACT: A ferromagnetic plated wire memory having a nonaxially aligned easy direction of magnetization with respect to the longitudinal axis of the wire memory and having spaced apart sections of ferromagnetic material along the wire memory free of said easy direction of magnetization.

Patented March 9, 1971 3,569,946

2 Sheets-Sheet 1

INVENTOR.
WILBUR G. HESPENHEIDE
BY
[signature]
ATTORNEY

INVENTOR.
WILBUR G. HESPENHEIDE
BY
[signature]
ATTORNEY

MAGNETIC MATERIAL AND DATA STORE

In a copending application, "Helical Wrap Memory" by John D. Blades, Ser. No. 748,405, filed Jul. 14, 1958, now U.S. Pat. No. 3,154,769, which is assigned to the assignee of this application, it is disclosed how beneficial results may be obtained by wrapping a central conductor with a ferromagnetic material having a direction of easy magnetization helical around the central conductor. In technical publications descriptions have been given of the production of a helical axis of easy magnetization by twisting either a solid ferromagnetic rod or a central conductor coated with ferromagnetic material. The consequences of such twisting were reported long ago by Wiedemann, and associated electrical phenomena are known as the Wiedemann effect. Twisting of a rod is a particular way of producing shear stresses in it; and shear, according to well known principles of elasticity, is equivalent to mutually orthogonal compressive and tensile stresses, at 45° with the direction of shear. Thus the twisting of a rod, while effective in producing a helical direction of easy magnetization in an external ferromagnetic skin, will necessarily produce (insofar as the twisting is effective in such production) a helical angle of 45°. Depending upon various design considerations, it may be desirable to produce directions of easy magnetization having helical angles either greater or less than 45°. Also, it is desirable to produce rods or wires which bear ferromagnetic coatings having controlled magnetic properties and helical directions of easy magnetization as produced, without the application of torsion. Yet more generally, it is desirable for many purposes to produce by electrodeposition a ferromagnetic coating having a controlled and predetermined direction of easy magnetization.

My invention consists in electroplating upon a base conductor, in a magnetic field a coating of ferromagnetic material of suitable magnetic properties, which, in consequence of the circumstances of its deposition, possesses a controlled direction of preferred or easy magnetization; and in addition in utilizing a base conductor thus coated as a device for storing information or data having two possible values or significances for each of its component units or bits.

Thus one object of my invention is to produce a conductive element having a controlled direction of easy ferromagnetization helical about its central axis.

Another object of my invention is to produce a conductive element having a controlled direction of easy ferromagnetization when in mechanical equilibrium without the external application of stresses, and consisting of a single mechanical element without the application of separate parts such as wrappings of tape or wire.

A further object of my invention is to produce a conductive element having a controlled direction of easy ferromagnetization which is peculiarly suited to inexpensive production in large quantities, and under conditions conducive to easy control of its magnetic properties.

Still a further object of my invention is to produce a central conductor coated with magnetic material having a controlled direction of easy magnetization and to utilize that product in the construction of a novel binary data store.

Other objects and advantages of my invention will appear in the subsequent specifications and description.

In a copending application, entitled "Magnetic Materials," Ser. No. 763,169, filed Sept. 25, 1958, now U.S. Pat. No. 3,047,475, which is assigned to the assignee of this application, I teach the deposition by electroplating of nickel-iron alloys of controllable magnetic properties, especially coercive force. I have found that the application of a magnetic field to such alloys during their deposition has the effect of producing in the deposited alloy a direction of easy or preferred magnetization substantially aligned with the direction of the field thus applied. The process of electrodeposition or electroplating requires the passage of currents in the vicinity of (and indeed, through) the material being deposited; but such current flow is not, in the prior art, controlled for the purpose of establishing magnetic fields of determined magnitude or direction; and the nature of the electrodeposition process produces a continuous variation in current flow through the base or substrate and the coating which necessarily makes any such fields highly variable over the surface on which deposition is occurring. My present invention, on the other hand, envisages the deliberate and controlled application of fields from conductors distinct from the ones being coated, or from permanent magnets, and also the deliberate and controlled passage through the conductor being coated of currents in excess of the depositing current, such that there will always be produced at the site of deposition a field sufficient in magnitude and direction to determine the direction of easy magnetization of the deposit.

My invention may be practiced in several ways. Where a simple pattern or disposition of the axis of easy or preferred magnetization (which will hereinafter be described by the short identification "preferred axis") is all that is required, it is usually possible to apply from a source other than the base conductor a magnetic field sufficient in magnitude to assure that its resultant with fields from plating currents and other casual sources will be substantially in the direction desired. However, there are particular applications where relatively complex forms of the preferred axis are desirable or essential, as, for example, a helical pattern about a central conductor, at a predetermined helical angle. Such a pattern may be produced according to my invention by passing through the central conductor during the plating operation a current in addition to the plating current. The current through the central conductor will produce a magnetizing field component circular around the central conductor. A current-carrying solenoid around the conductor will produce an axial magnetizing field component. The resultant magnetizing field will be helical about the wire, and will, if of sufficient intensity, produce a helical preferred axis, whose helical angle will be determined by the relative magnitudes of the magnetizing field component produced by the solenoid and of the magnetizing field component produced by the current through the central conductor. The amplitude of the resultant magnetizing field at any point can, of course, be calculated by the well-known rules for vector addition. Where the magnetizing field components produced by the current through the solenoid and the current through the central conductor are orthogonal, the resultant field is the square root of the sum of the squares of the amplitudes of the two magnetizing field components. The angle is thus arbitrarily adjustable by controlling the ratio of these magnitudes. It is true that the current through the central conductor will not be constant throughout its length, because some of the current will pass through the plating bath. However, this effect may be reduced to a permissibly low magnitude by making the current which passes completely through the wire during the plating operation sufficiently large compared with the plating current. Furthermore, if a continuous plating operation is conducted in which the wire is fed continuously through the plating bath (as is described in more detail hereinafter), each part of the wire will be subjected equally to all the slightly varying conditions, and the resulting product will therefore be uniform along its length.

For the better understanding of my invention, I include FIGS. of drawing, which are here listed and briefly described.

Figure 1:
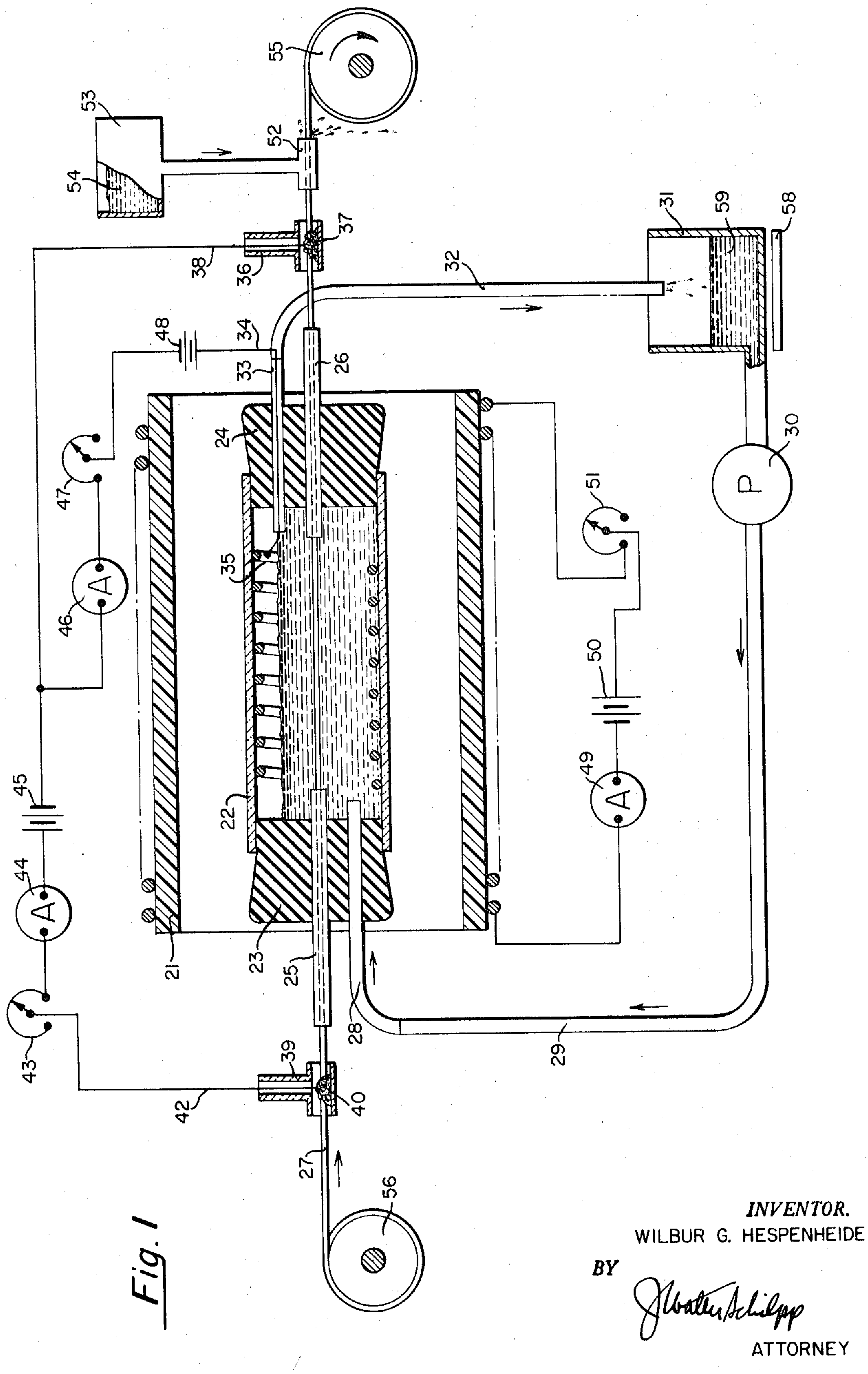
FIG. 1 represents, in section, an arrangement of apparatus for plating on a central conductor magnetic material having a preferred axis helical about the central conductor, by a continuous process.

In FIG. 1, solenoid 21 surrounds the plating cell 22, a glass tube stoppered by rubber stoppers 23 and 24. Capillary tube 25 is centrally located in stopper 23; it serves for ingress of wire 27 which is fed from reel 56, which revolves on bearings not detailed. Capillary tube 26 serves for egress of wire 27. In my experiments, I have found eight inches between the inner ends of tubes 25 and 26 satisfactory. The plating anode 35 is conveniently a helix of nickel wire wound to fit fairly snugly inside tube 22. The connection to anode 35 is made by conductor 34 which passes through tube 33, which is connected by flexible tube 32 to electrolyte storage container 31. The desired temperature for the electrolyte 59 may be obtained by the use of heater 58 to heat container 31 and its contents. The electrolyte 59 is circulated continuously by pump 30 through tube 29 and tube 28 into the plating cell or tube 22. I have found a rate of about 50 milliliters per minute satisfactory. Electrical connection to the moving wire is made by mercury contacts 37 and 40 which are held in tees 36 and 39, respectively. In operation, the plating current flows from current source 48, represented as a battery, through lead 34 to anode 35, into electrolyte solution 59, to wire 27, and through the wire 27 to mercury contact 37, thence to wire 38, via a branch to ammeter 46, rheostat 47, and back to current source 48. The magnetizing current through the wire 27 flows from current source 45, here represented as a battery, through ammeter 44, rheostat 43, lead 42, mercury contact 40 to wire 27, through wire 27 to mercury contact 37 and wire 38 back to current source 45. Solenoid 21 is fed current through its unnumbered leads from current source 50, represented as a battery, and rheostat 51, and the solenoid current is returned via ammeter 49 to current source 50.

In summary, the above description establishes the paths for a plating current to produce a plated coating on wire 27 during its passage through electrolyte 59 in tube 22; for additional magnetizing current through wire 27 from mercury contact 40 to mercury contact 37; and for current to solenoid 21. In one embodiment solenoid 21 is approximately 40 centimeters long, has an internal diameter of 1.25 inches, and is wound with 1804 turns of insulated wire.

The wire 27 is initially wound on reel 56, and passes through mercury contact 40, capillary tube 25, the electrolyte 59 which is circulating through tube 22, through capillary 26, mercury contact 37, a tee 52 which is continuously fed water 54 from a source 53, the said water serving to wash off traces of electrolyte 59, and is wound on motor driven reel 55, the motor not being shown. Reel 55 is substantially one foot in diameter.

It is apparent from the description of FIG. 1 that the wire will be plated by the plating current read by ammeter 46, during its passage through the space between tubes 25 and 26. The plating current and the magnetizing current read by ammeter 44 will both produce a magnetizing field circular around the portion of wire 27 being plated. The current in solenoid 21 will produce a field along the axis of the wire 27 in the region where plating occurs. By well-known principles of magnetism, the resultant magnetizing field around the portion of wire passing through the plating region will be helical.

For use in data stores employing so-called destructive readout, in which the reading out of stored data destroys the storage of that data (as is described in the copending application of Blades previously referenced) I have found the following a preferred set of conditions.

The wire 27 is tungsten 2 mils (thousandths of an inch) in diameter. The electrolyte is a water solution of iron sulfamate and nickel sulfamate containing 15 grams per liter of iron as ferrous ion and 77 grams per liter of nickel as nickelous ion. The pH of the solution is adjusted by addition of sulfamic acid as required to a value of 1.5. The solution temperature is maintained at 150° F. The plating current (read by ammeter 46) is 200 milliamperes. The additional magnetizing current (read by ammeter 44) is also 200 milliamperes. The current through solenoid 21 is adjusted to produce a field component of 41 oersteds. The speed of rotation of spool 55 is adjusted to produce a wire speed of 20 inches per minute. The resultant plated nickel-iron alloy demonstrates a preferred axis helical about the central axis of the tungsten wire.

Tungsten is desirable as a base conductor material because of its stiffness and high tensile strength. Also, being ordinarily employed in applications where a high order of surface cleanliness is essential, it requires no preliminary treatment as ordinarily supplied. Copper or other conductive base materials may be used where their properties are satisfactory, but may require preliminary cleaning or other treatments according to well known techniques of the electroplating art. Also, since very thin electroplated coatings are known to follow the crystal structure of the base material, it may be necessary to employ a form of material having a very small crystalline structure (or an amorphous surface structure) if the natural crystal structure of the base material is unfavorable to the formation of the natural structure of the magnetic alloy. Thin magnetic alloy coatings are desirable for high-speed operation, but thicker ones may be desirable for relatively slow operation, in order that the induced voltages produced by the use of the plated conductor may be of satisfactory amplitude.

Figure 2:
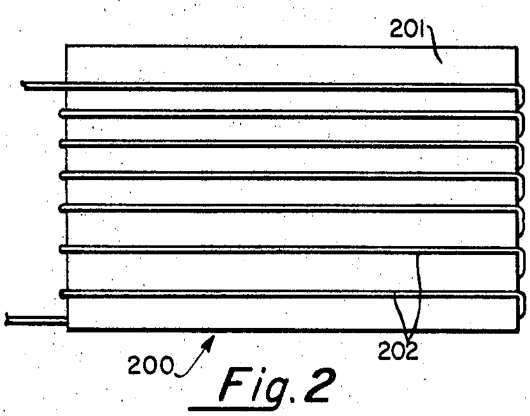
FIG. 2 represents a solenoid for producing a magnetizing field component for plating magnetic material having a preferred axis helical about a number of central conductors, which are represented in FIG. 3.
Figure 3:
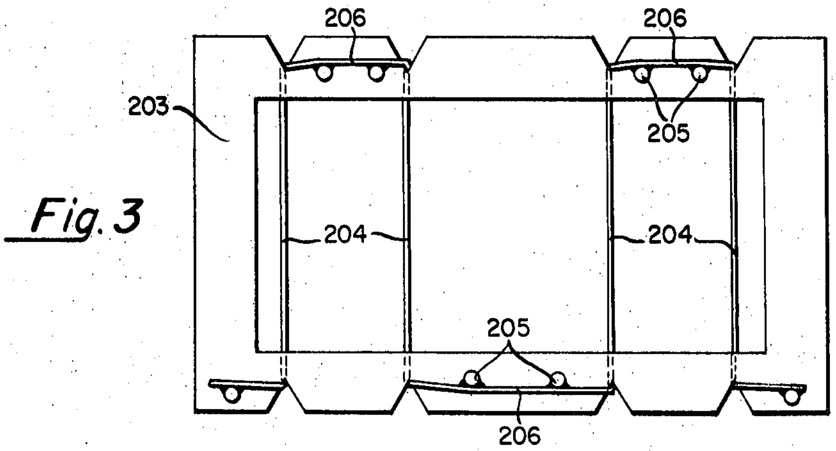
FIG. 3 represents a frame for holding a number of central conductors in position for plating.
Figure 4:
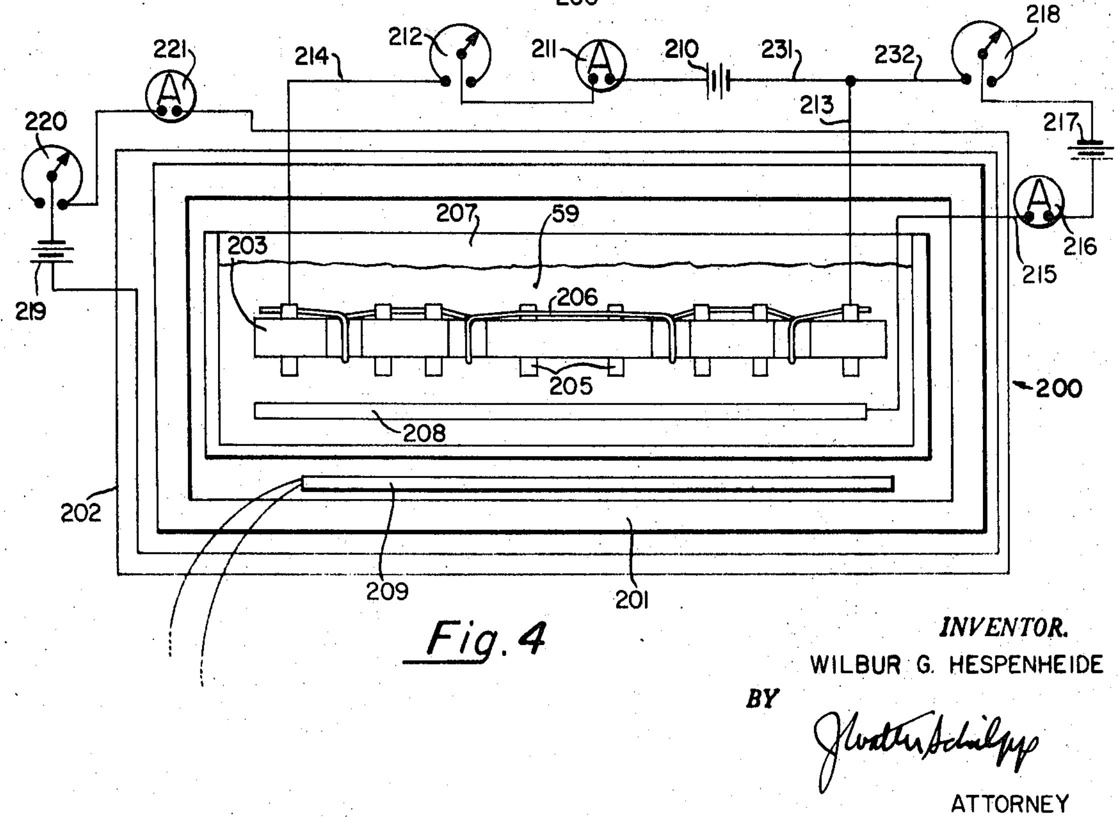
FIG. 4 represents the solenoid of FIG. 2, the frame and conductors of FIG. 3, and certain other apparatus for the process of plating the central conductors with magnetic material having a helical preferred axis.

It is not necessary to employ the continuous process of coating described in connection with FIG. 1, in order to practice my invention. FIGS. 2, 3, and 4 represent a useful way of practicing it with central conductors not in motion.

FIG. 2 represents a magnetizing solenoid 200 having a frame or support 201 and windings 202 of insulated wire.

FIG. 3 represents a frame 203 of suitable insulating material shaped to hold central conductors 204 spaced and parallel to each other. These central conductors are fastened to terminals 205; and the central conductors are connected in series with each other by continuations 206 which tie together the terminals 205 in pairs.

FIG. 4 represents the solenoid 200 situated around a container 207 (which may be a rectangular glass jar) in which there rests the frame 203 as represented in FIG. 3, and an anode 208 (which may conveniently be of nickel or nickel-iron alloy) to which there is connected conductor 215. The electrolyte 59 covers both anode 208 and the conductors 204. Heater 209 is provided to permit adjusting the bath temperature to a suitable value. Current from current source 219 (represented as a battery) passes through the winding 202 of solenoid 200, through ammeter 221, rheostat 220, and back to source 219. Suitable adjustment of rheostat 220 permits production of the desired magnetizing field component parallel to the axes of conductors 204 which, in this FIG., are perpendicular to the plane of the FIG. Magnetizing current from current source 210 (represented as a battery) flows through conductor 231, conductor 213, to the terminal 205 which is connected to one extreme of the series-connected conductors 204. The current then flows through the conductors 204 (via the continuations 206 between the pairs of terminals 205), out of the final terminal 205 into conductor 214, through rheostat 212 and ammeter 211 back to source 210. Plating current flows from source 217 (represented as a battery) through ammeter 216 and conductor 215 to anode 208, through the electrolyte 59 to conductors 204 (and casually also to terminals 205 and continuations 206, if they are not insulated) and thence through conductors 213 and 232 to rheostat 218 and thence back to source 217. Thus there are established the requisite flows of magnetizing and plating currents to cause the deposition upon conductors 204 in the open central portion of frame 203 of magnetic nickel-iron alloy having a helical preferred axis.

Figure 5:
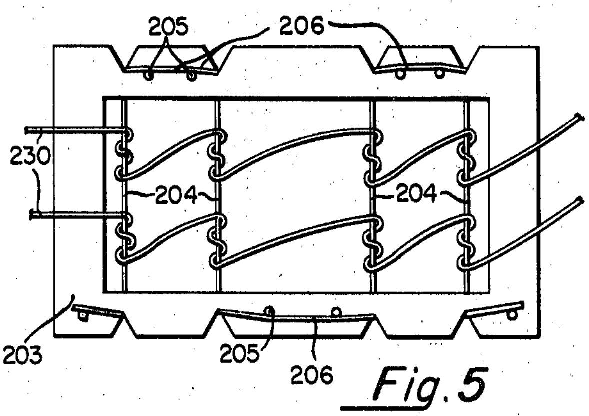
FIG. 5 represents the frame and conductors of FIG. 3 with additional windings to facilitate their use in a novel binary data store.

The preferred plating conditions for plating with the arrangement represented in FIG. 4 are the same as the preferred conditions for use with the arrangement represented in FIG. 1. However, the procedure of stretching the conductors 204 on a rigid support such as frame 203 has the advantage that a relatively soft central conductor, or one of very low tensile strength, or other property normally somewhat objectionable may be employed. To this end it is particularly useful to retain the conductors 204 on the frame 203 after plating, and apply the additional conductors required by the intended use to the conductors 204 in situ. Alternatively, if suitable provision is made to insure adequate circulation of the electrolyte into contact with all parts of the central conductors 204, the additional conductors may be applied before the operation of plating conductors 204. FIG. 5 represents an assembly like that of FIG. 3, but with the addition of conductors 230 wound as a series of solenoids around plated conductors 204. This will be recognized as one conventional form of data storage device which can make excellent use of the helical characteristic of the preferred axis of the plated magnetic alloy. Conductors 230 will ordinarily be required to be insulated in order that they may not make electrical contact with plated conductors 204. Since conductors 230 are solenoids about conductors 204, they may be applied before the operation of plating conductors 204, and current through insulated conductors 230 will produce a magnetizing field component axial to conductors 204 within the solenoids, but, in general not axial at those parts of conductors 204 lying outside the solenoids. Since it is the magnetic coating within the solenoids which is chiefly effective in use as a storage device, it will suffice if the external solenoid 200 is omitted in the plating operation and its field component is replaced as required by the passage of current through conductors 230 of such amplitude as to produce an equivalent field component at the surface of conductors 204 within the solenoids.

This basic idea may be expanded to a more general form. Thus a cloth of wires having bare woof and insulated warp wires, or vice versa, may be employed as a store with the bare wires being utilized like the conductors 204, and the insulated wires being utilized both to produce a magnetizing field component for plating, and to produce magnetizing field components and/or suffer the induction of voltages for use as a storage device.

In the FIGS., the plated coating on the conductors has not been represented separately because it would have added a complication to the understanding of the FIGS. without adding to the understanding of the invention. Also, certain FIGS. such as FIG. 5 would have had to be duplicated with the single difference that the plated coating would be represented on one FIG., but not on the other. Such prolixity of FIGS. seems undesirable.

It should be clearly understood that my copending application, "Magnetic Materials," mentioned above, describes many combinations of conditions for plating magnetic nickel-iron alloys which are applicable to the present invention. The prior art teaches the electrodeposition of nonmetallic materials which are ferromagnetic, such as ferrite materials. Deposition of such in a magnetizing field will produce alignment of the individual preferred directions, giving a ferromagnetic coating having orientations as herein described. Such procedure is applicable to the production of data storage devices as variously described herein.

I claim:

1. A magnetic memory comprising:

a first electrical conductor, said first conductor being solid and having a ferromagnetic plating along at least a portion of its length;

a plurality of second conductors intersecting said first conductor;

said ferromagnetic plating being substantially physically uniform and unbroken on said first conductor between said plurality of second conductors and having a plurality of spaced-apart sections, each being in the vicinity of a different one of said second conductors to form a memory cell and having a predetermined nonaxially aligned easy direction of magnetization with respect to the longitudinal axis of said first conductor in the absence of mechanically imparted torsional strain; and said spaced-apart sections being separated by portions of said magnetic plating that are free from said predetermined direction of easy magnetization.